United States Patent
Sung

(12) 
(10) Patent No.: US 6,492,297 B1
(45) Date of Patent: Dec. 10, 2002

(54) CATALYST COMPOSITION FOR PURIFYING EXHAUST GAS

(75) Inventor: Shiang Sung, New York, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/663,312

(22) Filed: Sep. 15, 2000

(51) Int. Cl.$^7$ ................................................ B01J 23/10
(52) U.S. Cl. ...................................... 502/304; 502/302
(58) Field of Search ................................. 502/302, 304, 502/349, 325, 339, 333, 334; 75/246, 247; 501/102, 103, 105

(56) References Cited

U.S. PATENT DOCUMENTS

| | | | |
|---|---|---|---|
| 4,049,583 A | * 9/1977 | Lauder | 252/466 PT |
| 4,808,564 A | 2/1989 | Matsumoto et al. | 502/303 |
| 5,015,617 A | 5/1991 | Ohata et al. | 502/304 |
| 5,075,276 A | * 12/1991 | Ozawa et al. | 502/304 |
| 5,275,997 A | 1/1994 | Ganguli et al. | 502/304 |
| 5,286,699 A | 2/1994 | Ohata et al. | 502/304 |
| 5,380,692 A | * 1/1995 | Nakatsuji et al. | 502/303 |
| 5,898,014 A | 4/1999 | Wu et al. | 502/302 |
| 6,171,572 B1 | * 1/2001 | Aozasa | 423/593 |

FOREIGN PATENT DOCUMENTS

| | | | |
|---|---|---|---|
| DE | 196 44 276 A1 | 7/1997 | C01G/25/00 |
| EP | 0 315 896 A1 | 5/1989 | B01D/53/36 |
| EP | 0 444 470 B1 | 9/1991 | B01J/23/10 |
| EP | 0 665 047 B1 | 2/1995 | B01D/53/94 |
| EP | 0 734 756 A2 | 10/1996 | B01D/53/94 |
| EP | 0 801 972 A1 | 10/1997 | B01D/53/94 |
| EP | 0 955 267 A1 | 11/1999 | C01G/25/00 |
| JP | WO-98/29341 A1 * | 7/1998 | C01G/25/00 |
| WO | WO 93/15834 | 8/1993 | B01J/23/10 |

* cited by examiner

Primary Examiner—Stanley S. Silverman
Assistant Examiner—Edward M. Johnson
(74) Attorney, Agent, or Firm—Richard A. Negin

(57) ABSTRACT

The present invention relates to a composite of cerium, zirconium and samarium components, a catalyst composition containing such composite and the use of the catalyst composition for the treatment of a gas stream to reduce contaminants contained therein. The catalyst composition has the capability of substantially simultaneously catalyzing the oxidation of hydrocarbons and carbon monoxide and the reduction of nitrogen oxides.

19 Claims, No Drawings

CATALYST COMPOSITION FOR PURIFYING EXHAUST GAS

BACKGROUND OF THE INVENTION

1. Field of the Invention

The present invention relates to a composite of cerium, zirconium and samarium components and to a catalyst composition containing such composite as well as the use of such catalyst composition for the treatment of a gas stream to reduce contaminants contained therein. More specifically, the present invention is concerned with catalyst compositions containing such composite of the type generally referred to as three-way conversion or "TWC" and a process of substantially simultaneously catalyzing the oxidation of hydrocarbons and carbon monoxide and the reduction of nitrogen oxides present in gas streams, particularly exhaust gas streams produced by internal combustion engines.

2. Discussion of Related Art

Three-way conversion catalysts (TWC) have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

It is well know that by the time engine exhaust gases travel from the outlet of the exhaust manifold through an exhaust pipe to a catalytic converter, the gases cool significantly relative to the temperature at or near the manifold, so that there is a significant period of a low rate of conversion of the pollutants in the exhaust gas stream before the exhaust gases heat the catalyst in the catalytic converter to its light-off temperature. Accordingly, during the cold start period of engine operation, there is a significant discharge of engine exhaust gas containing a relatively high amount of pollutants.

It is also well known in the art to reduce the level of pollutants in the exhaust gas stream, particularly the level of hydrocarbons and carbon monoxide, by using an air pump in conjunction with the engine to help oxidize such pollutants. However, vehicle manufacturers would prefer to avoid using mechanical pollution control devices such as air pumps which, with their associated plumbing and mechanical parts, affect the engine architecture and are difficult to control without having an adverse impact on the optimum performance of the engine. Accordingly, vehicle manufacturers would prefer, if at all possible, to tune the engine for optimum performance without using mechanical types of a pollution control device and instead meet the vehicle emission standards discussed below solely with the use of catalyst members. As discussed below, increasingly stringent governmental emission standards require, however, that cold-start emissions be reduced.

The current "LEVY" (low emission vehicle) standards in effect for all states other than California prohibit vehicle emissions above 0.08 gram of non-methane hydrocarbons per mile, 3.4 grams of carbon monoxide per mile and 0.2 gram of $NO_x$ (nitrogen oxides) per mile. Many vehicle manufacturers have difficulty in meeting the current standards solely with the use of available upstream and/or downstream catalyst compositions without the concurrent use of additional mechanical devices such as air pumps. Of even greater concern is the fact that the California Air Resource Board ("CARB")has promulgated new "ULEV" (ultra-low emission vehicle) standards that will prohibit vehicle emissions above 0.04 gram of non-methane hydrocarbons per mile, 1.7 grams of carbon monoxide per mile and 0.2 gram of $NO_x$ per mile. Moreover, based on historical trends in vehicle emission standards, it is likely that the new ULEV standards will be required nationwide within a few years. Unless an effective method of meeting the new ULEV standards can be rapidly developed and implemented, vehicle manufacturers face the difficult problem of achieving such standards without significant changes in engine/exhaust architecture, incorporation of additional mechanical pollution control devices and the use of large amounts of expensive precious metal-based catalyst systems.

For most vehicles, a large portion (i.e., up to about 80%)of the hydrocarbon emissions occurs during the first phase of the U.S. Federal Test Procedure ("FTP"), which encompasses the cold-start period of engine operation, and which requires simulation of cold-start, warm-up, acceleration, cruise, deceleration and similar engine operating modes over a specified time period. A variety of technologies are under development to reduce cold start hydrocarbon emissions, including close-coupled catalysts as disclosed in Ball, D. J., "Distribution of warm-up and Underfloor Catalyst Volumes," SAE 922338, 1992; electrically heated catalysts as disclosed in Piotrowski, G. K., "Evaluation of a Resistively Heated Metal Monolith Catalytic Converter on a Gasoline-Fueled Vehicle, EPA/AA/CTAAB/88–12,1988 and Hurley, R. G., "Evaluation of Metallic and Electrically Heated Metallic Catalysts on a Gasoline Fueled Vehicle," SAE 900504, 1990; hydrocarbon absorbers as disclosed in Heimrich, M. J., Smith, L. R., and Kitowski, J., "Cold Start Hydrocarbon Collection for Advanced Exhaust Emission Control," SAE 920847, 1992 and Hochmuth, J. K., Burk, P. L., Telentino, C., and Mignano, M. J., "Hydrocarbon Traps for Controlling Cold Start Emissions," SAE 930739, 1993; bypass catalysts as disclosed in Fraidl, G. K., Quissrk, F. and Winklhofer, E., "Improvement of LEV/ULEV Potential of Fuel Efficient High Performance Engines," SAE 920416, 1992; and burners as disclosed in Ma, T., Collings, N. and Hands, T., "Exhaust Gas Ignition (EGI)—A New Concept for Rapid Light-off of Automotive Exhaust Catalyst," SAE 920400, 1992. It has been reported that close-coupled catalysts, especially Pd-containing catalysts, are very effective at reducing hydrocarbon emissions during a cold start of the FTP cycle as disclosed in Ball, D. J., "Distribution of warm-up and Underfloor Catalyst Volumes," SAE 922338, 1992; Summers, J. C., Skowron, J. F., and Miller, M. J., "Use of Light-Off Catalysts to Meet the California LEV/ULEV Standards," SAE 930386, 1993; and Ball, D. J., "A Warm-up and Underfloor Converter Parametric Study," SAE 932765, 1993. Recently, Ford has reported a successful application of Pd-only catalyst for meeting stringent emission standards as disclosed in Dettling, J., Hu, Z, Lui, Y., Smaling, R., Wan, C and Punke, A., "SMART Pd TWC Technology to Meet Stringent Standards," Presented at $CAPoC_3$ Third International Congress on Catalyst and Automobile Pollution Control, Apr. 20–22, 1994, Brussels.

A typical motor vehicle catalyst is an underfloor TWC catalyst which catalyzes the oxidation by oxygen in the exhaust gas of the unburned hydrocarbons and carbon monoxide and the reduction of nitrogen oxides to nitrogen. TWC catalysts which exhibit good activity and long life comprise one or more precious metal components, e.g., platinum group metal components such as platinum, palladium, rhodium, ruthenium and iridium located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

The high surface area alumina support materials, also referred to as "gamma alumina" or "activated alumina," typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is disclosed to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al., U.S. Pat. No. 4,171,288.

Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al., discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al., and in U.S. Pat. No. 4,708,946 of Ohata et al.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The catalyst layer is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc. Oxides of cerium and praseodymium are particularly useful as oxygen storage components.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina-supported catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with some calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina-supported platinum group metal catalyst. The support is sequentially modified to include support stabilization by lanthana or lanthana rich rare earth oxides, double promotion by ceria and alkali metal oxides and optionally nickel oxide.

Palladium-containing catalyst compositions, see, e.g., U.S. Pat. No. 4,624,940, have been found useful for high temperature applications. The combination of lanthanum and barium is found to provide a superior hydrothermal stabilization of alumina which supports the catalytic component, palladium.

U.S. Pat. No. 4,780,447 discloses a catalyst which is capable of controlling CH, CO and $NO_x$ as well as $H_2S$ in emissions from the tailpipe of catalytic coinverter-equipped automobiles The use of the oxides of nickel and/or iron is disclosed as a hydrogen sulfide gettering-type of compound.

U.S. Pat. No. 4,965,243 discloses a method to improve thermal stability of a TWC catalyst containing precious metals by incorporating a barium compound and a zirconium compound, together with ceria and alumina. This is stated to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound. These patents suggest the utility of alkaline earth metals in combination with ceria, zirconias to form a thermally-stable alumina-supported palladium-containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g., co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of a gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by thermal decomposition. Optionally, a zirconia powder may be added to the coating slip.

It is a continuing goal to develop a TWC catalyst system which is inexpensive and stable and which permits the attainment of ULEV standards without the necessity for mechanical emission control devices such as air pumps and without adversely affecting the engine/exhaust architecture or performance.

SUMMARY OF THE INVENTION

The present invention relates to a composite of cerium, zirconium and samarium components and to a catalyst composition containing such composite as well as the use of such catalyst composition for the treatment of a gas stream to reduce contaminants contained therein. The catalyst composition which may be utilized in a close-coupled and/or medium-coupled mode adjacent to or near the exhaust manifold of the engine, and/or in a catalytic converter located "under the floor" of the vehicle downstream of the exhaust manifold. The catalyst composition may be utilized in the form of a single or multiple bricks, a single or multiple canisters, etc.

The particular mode (i.e., placement in respect to the exhaust manifold of the engine) and usage of the catalyst composition in the form of single or multiple bricks or canisters will depend on various factors such as the level of pollutants in the exhaust gas stream at the outset, desired maximum level of pollutants at the cold start phase of engine operation, auxiliary mechanical emission control devices such as air pumps, engine/exhaust architecture, etc.

More particularly, the catalyst composition of the invention is designed to reduce pollutants in automotive engine exhaust gas streams at temperatures as low as 350° C., preferably as low as 300° C. and more preferably as low as 200° C. The catalyst composition of the present comprises components which catalyze low temperature reactions. This is indicated by the light-off temperature. The light-off temperature for a specific component is the temperature at which 50% of that component reacts. It has been found that the catalyst compositions of the present invention provide for significant improvements in nitrogen oxides conversion as well as lower light-off temperatures in comparison to prior art TWC catalyst compositions. Moreover, the catalyst compositions of the invention are thermally stable upon exposure to temperatures up to 1100° C. and higher d ring the operating life of the engine. At the same time, the catalyst composition of the invention provides a relatively high hydrocarbon conversion rate as well as a high rate of conversion of nitrogen oxides to nitrogen.

DETAILED DESCRIPTION OF THE INVENTION

The composite of the present invention comprises a cerium component, a zirconium component and a samarium component. Preferably, the composite is in the form of a particulate oxide composite which comprises ceria, zirconia and samaria. The cerium component is present in the amount of 10 to about 90 wt. % preferably 15 to 70 wt. %, the zirconium component is present in the amount of about 10 to about 90 wt. %, preferably 15 to 70 wt. %, and the samarium component is present in the amount of about 1 to about 40 wt. %, preferably 7 to 20 wt. %, based on the weight of the composite. The catalyst composition of the present invention comprises a mixture of (a) the foregoing composite, (b) a catalytically effective amount of at least one precious metal component and (c) a refractory metal oxide support. The catalyst composition is preferably disposed on a carrier, typically a metal or honeycomb, in a desired amount. For example, the catalyst composition plus the support may comprise about 2 to about 50 wt. %, preferably 5 to 20 wt. %, based on the weight of the finished carrier, i.e., the weight of the catalyst composition plus the weight of the support plus the weight of the carrier. Typically, the composite will be present in the amount of about 0.01 to about 3 $g/in^3$, preferably 0.1 to 1 $g/in^3$, of the carrier.

Preferably, the precious metal component is formed as a layer or coating upon the support and the resultant coated support is then mixed with the composite. The mixture of the precious metal-coated support and the composite is then deposited upon the carrier generally K a coated layer over most, if not all, of the surfaces of the carrier contacted. The combined structure, i.e., the mixture of the precious metal-coated support and the composite plus carrier, is then dried at a temperature of about 110° C. for 2 to 5 hours and calcined in air at a temperature of 400 to 600° C.

In general, any suitable carrier may be used for the catalyst composition such as a monolithic carrier having a honeycomb structure, i.e., a plurality of gas flow passages extending therethrough from an inlet or an outlet face of the carrier, so that the passages are open to fluid flow therethrough. The passages are defined by walls on which the catalytic material is coated as a "washcoat" so that the gases flowing through the passages will contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 700 or more, usually about 200 to 400, gas inlet openings ("cells") per square inch of cross section.

For the purposes of the present invention, when the catalyst composition of the invention is coated onto such a carrier typically as a washcoat, the amounts of the various components are presented based on grams per volume. When the ingredients are applied as a thin coating to a carrier substrate, the amounts of ingredients are conventionally expressed as grams per cubic foot (g/ft$^3$) of the carrier for the precious metal component(s) and grams per cubic inch (g/in$^3$) of the carrier for the other ingredients (i.e., the composite and the support) as this measure accommodates different gas flow passage cell sizes in different monolithic carrier substrates.

The carrier may comprise a refractory ceramic or metal having a honeycomb structure. Suitable refractory ceramic materials include alumina, silica, titania and zirconia compounds, e.g., cordierite (which is preferred), cordierite-alpha alumina, silicon nitride, zircon mullite, spodumene, alumina-silica magnesia, zircon silicate, sillimanite, magnesium silicates, zircon petalite, alpha alumina and aluminosilicates. A metallic honeycomb made be made of a refractory metal such as stainless steel or other suitable iron-based corrosion-resistant alloys.

The refractory metal oxide support includes materials such as activated compounds selected from the group consisting of alumina (which is preferred), silica, titania, silica-alumina, alumina-silicates, alumina-zirconia, alumina-chromia, alumina-ceria and mixtures thereof Typically, the refractory metal oxide support will be present in the amount of about 0.1 to about 4.0 g/in$^3$ of carrier and will be present in the form of finely divided, high surface area particles having a particle size above 10–15 micrometers. Preferably, the activated alumina is thermally stabilized to retard undesirable alumina phase transformations from gamma to alpha at elevated temperatures by doping the activated alumina with a rare earth component such as lanthanum (preferred) or neodymium or mixtures thereof in an amount of about 0.02 to about 0.5 g/in$^3$ of carrier.

The precious metal component of the catalyst composition comprises one or more metals selected from the group consisting of gold, silver and platinum group metals. Platinum group metals include platinum, palladium, rhodium, ruthenium and iridium components and mixtures thereof The precious metal component(s) are typically present in the amount of about 0.1 to about 250 g/ft$^3$, preferably 0.5 to 100 g/ft$^3$ of the carrier. The preferred precious metal components are platinum, rhodium or a mixture of platinum and rhodium metal components which are typically present in a platinum:rhodium ratio of about 0.1:1 to about 20:1, preferably 1:1 to 10:1.

A process which can be used to prepare the composite of the present invention starts with the preparation of a zirconium hydroxide sol. This sol can be prepared by precipitating zirconium sulfate with sodium hydroxide at high temperature reflux, typically from 90 to 100° C. to make nanometer-size crystals (typically up to 100 nanometers). Impurities, e.g., sodium, sulfur, etc. can be washed out with an aqueous liquid. An acid, e.g., nitric acid, can be used to break up the aggregates to obtain the zirconium hydroxide sol and to reduce the pH of the liquid. At this stage, the cerium and samarium components in the form of salts such as nitrates are added. The composite sol should be sufficiently acidic, e.g., a pH of 0.5 to 3, preferably, 0.5 to 2.0, at this point in order to keep the salts in solution. The pH can then be quickly increased, e.g., with ammonia, to precipitate the composite compounds. The formation of large aggregates is preferably avoided by controlling the pH. The precipitated composite can then be washed with an aqueous liquid such as deionized water and dried at suitable conditions in air in an oven at temperatures of up to 250° C., typically at 150° C., for as long as necessary, usually overnight. The precipitated composite can then be calcined in air at elevated temperatures to convert the composite to particulate oxide composite which comprises ceria, zirconia and samaria. The calcination process is typically carried out at a temperature of 450 to 750° C., preferably 550° C. for 0.5 to 10 hours, preferably 2 hours. The resultant composite of ceria, zirconia and samaria may then be mixed with the precious metal component which has been preferably disposed, i.e., layered or coated, on the refractory metal oxide support.

The catalyst composition may be prepared by mixing the composite prepared as set forth above with the precious metal component and the refractory metal oxide support in the form of an aqueous slurry, comminuting the slurry (i.e., by ball milling), mixing the comminuted slurry with the carrier followed by drying and calcination. However, it is preferred that the composite be mixed with the precious metal component which has been previously disposed on the refractory metal oxide support.

The precious metal component(s) disposed on the refractory metal oxide support may be prepared in the following manner which involves the preparation of an aqueous slurry of the precious metal component(s) and the refractory metal oxide support. The method involves fixing the precious metal component(s) onto at least one support. The fixing step can be any of the suitable fixing steps known in the prior art such as chemical or thermal fixing. A preferred fixing step is to thermally fix the precious metal component(s) to the support. This is preferably conducted in air at a temperature of 50 to 500° C. for about 0.5 to about 2 hours.

Typically, the refractive metal oxide support, e.g., activated alumina, is impregnated with an aqueous solution or dispersion of the precious metal component present as a compound or complex. The selected precious metal compound or complex should be one which, upon calcination or use thereof, decomposes or otherwise converts to a catalytically active form, usually the metal or metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the catalyst, such compounds are converted into a catalytically active form of the platinum-group metal or a compound thereof A preferred method of preparing the catalyst composition of the invention is to prepare a mixture of a solution of at least one platinum-group metal, e.g., platinum amine complex and/or rhodium nitrate, and at least one finely divided, high surface area, refractory metal oxide support, e.g., activated alumina, which is sufficiently dry to absorb substantially all of the solution to form a slurry. Preferably, the slurry is acidic, having a pH of about 2 to less than 7. The pH of the slurry may be lowered by the addition of a minor amount of an inorganic or organic acid such as acetic acid (preferred), hydrochloric acid or nitric acid, to the slurry. Thereafter, if desired, a refractory metal oxide support stabilizer, e.g., lanthanum nitrate, and/or a binder, e.g., zirconia acetate, and/or an alkaline earth metal compound promoter, e.g., strontium nitrate, may be added to the slurry. Thereafter, the ceria-zirconia-samaria composite prepared as described above is added. At this point, the slurry of the catalyst composition of the invention will have a solids concentration of about 45–50 wt. %, a pH of 4–5 and a viscosity of 50–100 centipoise at 20° C.

The slurry of the catalyst composition is thereafter comminuted. The comminution may be accomplished in a ball mill or other similar equipment for 4–8 hours with the result such that the final particle size will typically be that the final particle size will be 90% less than about 10 microns. This slurry can then be used to coat a macro size carrier preferably having a low surface area. For example, a honeycomb carrier such as cordierite is immersed in the slurry and the coated honeycomb carrier is then placed in a drying oven and dried at about 110° C. for about two to five hours. The dried honeycomb is then calcined in air at about 400–600° C. for about one hour.

The present invention is illustrated by the following examples which are not intended to limit the scope of the invention. Unless otherwise indicated, all amounts and percentages are on a weight basis.

EXAMPLE 1

Preparation of Reference Catalist A

In a mixer, were placed 400 g of pure (>99.5%) gamma-alumina having a surface area of 150 $m^2/g$, 80 g of lanthanum-stabilized alumina having a surface area of 100 $m^2/g$ and 700 g of a ceria/zirconia composite obtained from W. R. Grace Co. with the product code designation of "MI560". MI-560 had a ceria content of 58.7%, a zirconia content of 42.3% and trace amounts of Pr, La, Nd, Sm, Y Si, Na and S. This composite had a surface area of 138 $m^2/g$ and a surface area of 37 $m^2/g$ after being heated at 900° C. for four hours. These ingredients were thoroughly mixed and 77.2 g of an aqueous solution of a platinum amine solution were added dropwise into the mixture while stirring was maintained. Thereafter, 40 g of acetic acid were added to the mixture after the addition of the platinum solution was completed. Water was then added resulting in a solids concentration of 50% and a pH of 4–5.

The resultant slurry was then placed in a one-gallon ball mill with 2000 g of ball media. The slurry was milled for about 6–8 hours and the final particle size of the comminuted slurry was 90% <10 microns.

The procedure was repeated for the rhodium slurry using 160 g of a mixture of equal amounts of high surface area (150 $m^2/g$) and low surface area (90 $m^2/g$) alumina, 160 g of a ceria-zirconia composite (20 Ce/80 Zr) prepared in accordance with U.S. Pat. No. 5,898,014, and 170 g of zirconium acetate solution (for use as a binder). A solution (29 g) of rhodium nitrate was used for this slurry.

The Pt and Rh slurries were then mixed to form a final slurry having a solids content of 45–50%, a pH of 4–5 and a viscosity of 50–100 centipoise @20° C. A cordierite honeycomb having a diameter of 3.66 inches, a length of 4.5 inches, a cell density of 400 and a wall thickness of 6.5 mil was coated with this slurry by immersion and the channels were cleared of slurry residue by an air gun. The coated honeycomb was then placed in a drying oven and dried at 120° C. for four to eight hours. Thereafter, the dried honeycomb was calcined in air at 500° C. for 1 hour.

Additionally, honeycombs having a diameter of 1.5 inches and a length of 3 inches were used to prepare core samples. Catalyst bricks formed from reference catalyst A had a precious metal loading of 40 $g/ft^3$ and a Pt:Rh ratio of 5:1.

EXAMPLE 2

Preparation of Invention Catalyst B

Example 1 was repeated using a cerium/zirconium/samarium composite obtained from W. R. Grace Co. with the product code designation of "MI-560-Sm". MI-560-Sm had a ceria content of 58.1%, a zirconia content of 42.3%, a samaria content of 9.2% and trace amounts of Pr, La, Nd, Sm, Y Si, Na and S. This composite had a surface area of 134 $m^2/g$ and a surface area of 38 $m^2/g$ after being heated at 900° C. for four hours.

EXAMPLE 3

Catalyst Aging/Evaluation

Core samples of catalyst A and catalyst B were placed in an Inconel Reactor and subjected to a rich and lean 4-mode aging cycle in an engine dynamometer with an inlet temperature of 850° C. for 50 hours. The resultant core samples were then evaluated in a laboratory multi-cycle redox reactor with an air/fuel ratio at the stoichiometric point at a frequency of 0.5 Hz and peturbation of ±0.1. The inlet gas concentrations were: $CO/H_2$:0.3%; $O_2$:0.3%; $CO_2$:15%; $C_3H_6$:235 ppm; NO : 1500 ppm; $SO_2$:45 ppm; $H_2O$:10%; $N_2$: balance for the steady state. During the peturbation: $CO/H_2$:0.75% in rich and $O_2$:0.6% in lean operation. The temperature ramp rate was 10° C./minute. The space velocity of the core was 25,000 $hr^{-1}$. The results set forth in Tables I–IV below clearly show that the Ce/Zr/Sm composite of the invention (represented by catalyst B) enhances the light-off and $NO_x$ conversion performance as compared to the Ce/Zr composite not containing any samarium (represented by catalyst A).

TABLE I

LIGHT-OFF TEMPERATURE COMPARISON

| | Light-Off (50% Conversion) Temperature, ° C. | | |
|---|---|---|---|
| | HC | CO | $NO_x$ |
| Catalyst A | 316 | 297 | 281 |
| Catalyst B | 300 | 280 | 265 |

TABLE II

HC CONVERSION, %

| | 250° C. | 300° C. | 350° C. | 400° C. |
|---|---|---|---|---|
| Catalyst A | 0.5 | 22 | 62 | 75 |
| Catalyst B | 0.1 | 50 | 67 | 76 |

TABLE III

| | CO CONVERSION, % | | | |
|---|---|---|---|---|
| | 250° C. | 300° C. | 350° C. | 400° C. |
| Catalyst A | 3.3 | 53 | 71 | 75 |
| Catalyst B | 5.1 | 72 | 79 | 80 |

TABLE IV

| | $NO_x$ CONVERSION, % | | | |
|---|---|---|---|---|
| | 250° C. | 300° C. | 350° C. | 400° C. |
| Catalyst A | 11 | 89 | 77 | 81 |
| Catalyst B | 16 | 90 | 89 | 97 |

What is claimed is:

1. A catalyst composition disposed on a carrier comprising a mixture of (a) a composite of a cerium component, a zirconium component and a samarium component, (b) a catalytically effective amount of at least one precious metal component and (c) a refractory metal oxide support, said composite being present in an amount of about 0.01 to about 3 g/in³ of the carrier.

2. The catalyst composition of claim 1 wherein the cerium component is present in the amount of 10 to about 90 wt. % ceria, the zirconium component is present in the amount of about 10 about 90 wt. % and the samarium component is present in the amount of about 1 to about 40 wt. % based on the weight of the composite.

3. The catalyst composition of claim 2 wherein the cerium component is present in the amount of 15 to 70 wt. %, the zirconium component is present in the amount of 15 to 70 wt. % and the samarium component is present in the amount of 7 to 20 wt. %, based on the weight of the composite.

4. The catalyst composition of claim 1 wherein the cerium component comprises ceria, the zirconium component comprises zirconia and the samarium component comprises samaria.

5. The catalytic composition of claim 1 wherein the precious metal component is disposed on the refractory metal oxide support.

6. The catalyst composition of claim 1 wherein the composite is present in the amount of 0.1 to 1 g/in³ of the carrier.

7. The catalyst composition of claim 1 wherein the precious metal component comprises a platinum group metal component.

8. The catalyst composition of claim 7 wherein the platinum group metal component is selected from the group consisting of platinum, palladium, rhodium, ruthenium, iridium and mixture thereof.

9. The catalyst composition of claim 8 wherein the platinum group metal component comprises platinum metal components, rhodium metal components or a mixture of platinum and rhodium metal components.

10. The catalyst composition of claim 9 wherein the platinum group metal component comprises a mixture of platinum and rhodium metal components and the ratio of the platinum metal component to the rhodium metal component is in the range of about 0.1:1 to about 20:1.

11. The catalyst composition of claim 10 wherein the ratio of the platinum metal component to the rhodium metal component is in the range of 1:1 to 10:1.

12. The catalyst composition of claim 1 wherein the precious metal component is present in an amount of about 0.1 to about 250 g/ft³ of the carrier.

13. The catalyst composition of claim 12 wherein the precious metal component is present in an amount of 0.5 to 100 g/ft³ of the carrier.

14. The catalyst composition of claim 1 wherein the carrier is a monolithic carrier comprising a refractory ceramic or metal having a honeycomb structure.

15. The catalyst composition of claim 14 wherein the carrier comprises cordierite.

16. The catalyst composition of claim 1 wherein the refractory metal oxide support is selected from the group consisting of alumina silica, titania and zirconia compounds.

17. The catalyst composition of claim 16 wherein the refractory metal oxide support is selected from the group consisting of alumina, silica, titania, silica-alumina, alumina-silicates, alumina-zirconia, alumina-chromia, alumina-ceria and mixtures thereof.

18. The catalyst composition of claim 17 wherein the refractory metal oxide support comprises activated alumina.

19. The catalyst composition of claim 18 wherein the activated alumina is present in an amount of about 0.1 to about 4.0 g/in³ of the carrier.

* * * * *